Patented Dec. 5, 1922.

1,438,113

UNITED STATES PATENT OFFICE.

CLAUDE S. HUDSON, OF HYATTSVILLE, MARYLAND.

METHOD OF MAKING DECOLORIZING CARBONS.

No Drawing. Application filed February 15, 1919. Serial No. 277,345.

*To all whom it may concern:*

Be it known that I, CLAUDE S. HUDSON, a citizen of the United States, residing at Hyattsville, in the county of Prince Georges and State of Maryland, have invented new and useful Improvements in Methods of Making Decolorizing Carbons, of which the following is a specification.

The present invention relates to the art of making decolorizing carbons, and its object is to provide a novel and improved process whereby carbon of great decolorizing power may be produced economically by charring animal or vegetable substances.

Other processes of making decolorizing carbon have been heretofore used or proposed, but such processes presented the disadvantage that it was expensive to carry them out and that the yield of carbon was very small, or that it was necessary to thoroughly remove from the carbon some substance of a deleterious or poisonous nature to avoid injurious contamination of materials that may be treated by the carbon so produced. For example, it is well known that by passing steam or carbon dioxide over charred wood at a high temperature (800–1,000° C.) it is possible to produce carbon of relatively high decolorizing power, but the yield of carbon by such process is small, often less than 10% of the weight of the wood, because the charcoal is slowly consumed by the oxidizing action of the gases. Since the percentage of carbon in dry sawdust is about forty, there is a loss of about thirty percent of carbon or about 75 percent of the theoretical yield, by that process, and the fuel consumption is large because of the high temperature used and the prolonged period of time that the carbon must be heated to make it of high decolorizing power. Also it has been proposed to impregnate sawdust with zinc chloride solution, the mass being then carbonized at a relatively low temperature corresponding to the distilling temperature of the zinc chloride, after which the zinc chloride and zinc oxide resulting from it are leached out of the residual carbon. Such a process presents the objection that it requires the exercise of the greatest care in the total removal of the zinc compounds from the carbon; otherwise the sugar liquors or other food products treated with such a carbon would become injuriously contaminated with objectionable zinc compounds.

The present invention provides a process of making decolorizing carbon at relatively small cost and at a relatively low temperature. The yield of carbon obtainable by this process is 90 percent or more of the theoretical yield, the carbon is of a very great decolorizing power, and furthermore the carbon produced in accordance with the present invention will not injuriously contaminate substances that may be treated with it; hence such carbon is particularly well adapted for use in the decolorizing of sugar.

According to the present invention, carboniferous substances of either vegetable or animal origin are impregnated with a fusible acid which will not boil out or be reduced by the carbonaceous material employed at a temperature of 375° C. and which will not react with the carbonaceous material employed to form compounds stable at a temperature of 375° C., phosphoric acid being suitable and preferred, and the mass so impregnated is heated to a temperature preferably above 375° C. to produce thorough carbonization. It will be found that the residual carbon has attained high decolorizing power. By thus carrying out carbonization in the presence of sufficient phosphoric acid to produce a carbon of high decolorizing power, there is very small loss of carbon through the generation of volatile products, it having been found that the yield of carbon by this process is 90 percent or more of the theoretical amount of carbon that is present in the carboniferous substance used, and furthermore, the carbon thus produced possesses a decolorizing power several times greater than that possessed by the best carbon produced by the high temperature oxidation processes. Its decolorizing power on raw sugar solutions is about 150 times that of an equal weight of an average quality bone-char or about five times that of the best decolorizing carbons heretofore obtainable. Because of the relatively low temperature at which the carbonization can be effected, this temperature being below a red heat, though the process can be carried out at a red heat without injuring the decolorizing power of the carbon, much economy in fuel is effected and other advantages are obtained as compared with high-temperature oxidation processes. Also, since phosphoric acid or its salts are purposely added to sugar liquors in the usual processes of clarification, the traces of phosphoric acid that may remain in the finished carbon after leaching the carbon with water would not be injurious and hence the leaching of such acid from the carbon would not involve the difficulty and expense that would be involved in the removal of a substance which is injurious to health, as are the salts of zinc. Boric acid may be used in place of phosphoric acid in such cases in which the carbon is to be used for decolorizing mineral oils or other substances where there would be no objection to the presence therein of a small amount of boric acid that may be given up by the carbon during the decolorizing operation. In cases where the carbon produced by the action of boric acid is to be used on food products it would probably be necessary to leach out the boric acid completely from the carbon and owing to the necessity for this expensive operation, phosphoric acid is usually preferable over boric acid.

The following are examples of the preferred ways of carrying out the invention:—

*Example 1.*

One part of sawdust or other carbonaceous material, such as corn cobs, is thoroughly wetted and impregnated with two parts of phosphoric acid, which may be in the form of an aqueous solution of phosphoric acid, or of those substances that generate phosphoric acid in the presence of water, namely metaphosphoric acid and pyrophosphoric acid, and the sawdust thus wetted and impregnated is heated, the temperature being gradually raised until carbonization is complete, the preferred range for the finishing temperature being between 400° C. and 600° C. As the mixture dries, the sawdust carbonizes, it becoming black, dry and granular, and when the temperature of complete carbonization, as given in the range mentioned, is approached and reached, white vapors of metaphosphoric acid evaporate. These vapors may be condensed and recovered and the resulting acid may be reused in the treatment of fresh charges of sawdust. The resulting carbon is cooled and separated from the solid metaphosphoric acid that remains with it, by leaching out the acid with water, and the acid so removed may be reused with fresh sawdust, after concentrating such acid if found necessary. The carbon from which the acid has been removed may be dried, ground and otherwise put into marketable form for use as a decolorizing carbon.

*Example 2.*

A carbon of high decolorizing power may be prepared from carbonaceous animal matter in the following way. As an inexpensive source of carbonaceous animal material, scrap-leather may be used, one part of scrap-leather being saturated with a solution of two parts of phosphoric acid, the mixture being dried and carbonized by heat, the heating being continued until carbonization is complete, the finishing temperature preferably ranging between 400° C. and 600° C., white vapors of metaphosphoric acid evaporating and these vapors may be condensed as in the preceding example. The resulting carbon is cooled and the residual phosphoric acid, which is present mainly in the form of metaphosphoric acid, is then leached out with water and the carbon is prepared for industrial use in the same way as that indicated in Example 1. This carbon prepared from animal material has decolorizing power substantially equal to that prepared from carbonaceous vegetable material, as described in the preceding example.

When boric acid is used in place of phosphoric acid, the procedure will be the same as that described in the two examples, and the results obtained will be substantially the same as those described. The well known property of boric anhydride of being less volatile than meta-phosphoric acid will somewhat alter the visual phenomena and the condensation of any vapors containing boric acid will be less important, and it may be necessary to leach out the carbon more thoroughly than is done with phosphoric acid.

I have found that the decolorizing power of the finished carbon varies according to the proportion of phosphoric or boric acid which is mixed with the carbonaceous vegetable or animal material, and that a carbon of marked activity in comparison with ordinary wood charcoal can be produced if the proportion of acid is as small as one half part of acid to one part of carbonaceous material but a carbon of much greater activity is obtained if the quantity of acid is increased to that given in the two foregoing examples, namely two parts acid to one of sawdust or other carbonaceous material. Furthermore, the temperature to which the mixture of carbonaceous vegetable or animal material and acid is heated is of much importance, for at temperatures ranging between 300° and 375° C., a soft mushy carbon of only moderate decolorizing power is obtained, while a hard carbon suitable for industrial use where filter-pressing operations are involved, and one which has a very high decolorizing power, is produced, if the finishing temperature is not below 375° C. However, if it is desired to make the carbon by the most rapid and economical process, a carbonizing temperature of 400° C. or over may be used, and the carbon produced at such higher temperature will possess relatively higher decolorizing power, and it will be relatively harder than carbon made at a lower temperature. The increased yield of carbon and the superior decolorizing power thereof, obtainable by the present invention, are due, I believe, to three factors: first, the destructive distillation of the carbonaceous substances takes place in the presence of an acid capable of forming esters with the carbonaceous materials, and the course of the destructive distillation is thereby profoundly modified; second, during the completion of the process of carbonization, the surfaces of the carbon particles are thoroughly cleaned by the hot acid flux; third, the carbon is protected from oxidation, that is to say, made fireproof, by the presence of the fused acid and does not burn away even with free access of air.

The process may be used not only for the carbonization of uncharred carbonaceous vegetable and animal materials, but it also may be used for the regeneration of decolorizing carbon. When so used, the procedure may be the same as that herein described, although a smaller proportion of acid is required because there would be a smaller amount of organic matter to be carbonized, that is, only the organic matter taken up by the carbon during the decolorizing operation would require corbonization.

In some cases it may be desirable to obtain decolorizing carbon associated with metaphosphoric acid, as such a product would be of industrial value in the clarification of sugar liquors, and the association of the acid with the carbon would enable the acid to be shipped and handled more conveniently than is possible with the acid alone. In such event, the charcoal resulting from the carbonization and which contains the metaphosphoric acid is taken up without separating the charcoal from the acid, the decolorizing charcoal and the associated acid being yielded as an intermediate product by the process herein described. This intermediate product consisting of decolorizing carbon impregnated with metaphosphoric acid is in the form of a dry granular powder.

I claim as my invention:—

1. The process of making a decolorizing carbon which comprises impregnating a carbonizable organic material with a fusible acid, which carbonizable material will not form with such acid compounds stable at 375° C. and which acid will not boil out and is not reduced by such carbonizable material at 375° C., and carbonizing such acid-impregnated material at a temperature not lower than 375° C.

2. The process of making a decolorizing carbon which comprises mixing a carbonizable vegetable material with a fusible acid which will not boil out and is not reduced by such carbonizable material at a temperature of 375° C., and carbonizing such mixture, by heat, at a temperature not lower than 375° C.

3. The herein described process which comprises mixing a carbonizable organic material with a fusible acid, which carbonizable material will not form with such acid compounds stable at 375° C., and which acid will not boil out and is not reduced by such carbonizable material at 375° C., the mixture being in the proportion of not less than one-half part of acid to one part of carbonizable material, and carbonizing the mixture, by heat, at a temperature not less than 375° C.

4. The herein described process which comprises mixing a carbonizable vegetable material with a fusible acid which will not boil out and is not reduced by such carbonizable material at 375° C., the mixture being in the proportion of not less than one-half part of acid to one part of carbonizable material, and carbonizing the mixture by heat at a temperature not less than 375° C.

5. The herein described process which comprises mixing a carbonizing vegetable material with phosphoric acid, and carbonizing the mixture at a temperature not less than 375° C.

6. The process of making decolorizing carbon which comprises mixing phosphoric acid with a carbonaceous material which will not form with such acid compounds stable at 375° C., carbonizing such mixture, by heat, at a temperature above 375° C., and separating and recovering the resulting decolorizing carbon from acid remaining in the material.

7. The process of making decolorizing carbon which comprises incorporating phosphoric acid with a carbonaceous material which will not form with such acid compounds stable at 375° C., the acid and carbonaceous material being incorporated in the proportion of at least one-half part of acid to one part of carbonaceous material, and carbonizing the resulting mass by heat at a temperature above 375° C.

8. The herein described process which comprises incorporating phosphoric acid with a carbonizable vegetable material in substantially the proportion of one part of the carbonizable material to two parts of the acid, and carbonizing such acid-impregnated carbonizable material, by heat, at a temperature not lower than 375° C.

9. The herein described process which comprises incorporating phosphoric acid with a carbonizable organic material which will not form with such acid compounds stable at 375° C., the acid and carbonizable material being incorporated in substantially the proportion of one part of carbonizable material to two parts of the acid, and carbonizing the acid-impregnated carbonizable material, by heat, at a temperature not lower than 375° C.

10. The herein described process which comprises incorporating phosphoric acid with a carbonaceous material which will not form with such acid compounds stable at 375° C., the carbonaceous material and acid being incorporated in substantially the proportion of one part of carbonaceous material to two parts of acid, carbonizing the acid-impregnated carbonaceous material, by heat, at a temperature not lower than 375° C., and separating and recovering the resulting decolorizing carbon from acid remaining in the material.

11. As a product, a dry granular powder consisting of decolorizing carbon impregnated with metaphosphoric acid.

12. The process which comprises mixing phosphoric acid with a carbonizable organic material which will not form with such acid compounds stable at 375° C., carbonizing such material, while mixed with said acid, by heat, and recovering the resulting decolorizing carbon impregnated with metaphosphoric acid.

13. The process of making a decolorizing substance which comprises mixing carbonizable organic material with a fusible acid, which carbonizable material will not form with such acid compounds stable at 375° C., and which acid will not boil out and is not reduced by such carbonizable material at 375° C., carbonizing such material, while mixed with said acid, by heat, and separating the resulting carbonized material from acid remaining in the material.

14. The process which comprises mixing phosphoric acid with a carbonizable material which will not form with such acid compounds stable at 375° C., heating such mixture to a carbonizing temperature, and removing the acid used from the resulting carbonized material.

15. The process of revivifying spent or used decolorizing carbon which comprises mixing the spent or used carbon, containing carbonizable organic material, with a fusible acid which carbon or carbonizable material will not form with such acid, compounds stable at 375° C. and which acid will not boil out and will not be reduced by the carbon or such carbonizable material at 375° C., carbonizing said material while mixed with such acid, by heat, and separating the resulting decolorizing carbon from acid remaining in the material.

16. The process of revivifying spent or used decolorizing carbon which comprises mixing phosphoric acid with spent or used carbon which will not form with such acid compounds stable at 375° C., carbonizing the mixture by heat, and separating the resulting decolorizing carbon from acid remaining in the material.

17. The process of revivifying spent or used decolorizing carbon which comprises mixing phosphoric acid with spent or used vegetable carbon, containing carbonizable organic material, which will not form with such acid, compounds stable at 375° C., and carbonizing said material while mixed with such acid, by heat, at a temperature not lower than 375° C.

In testimony whereof I have hereunto set my hand in presence of a subscribing witness.

CLAUDE S. HUDSON.

Witness:
C. A. BATEMAN.